UNITED STATES PATENT OFFICE.

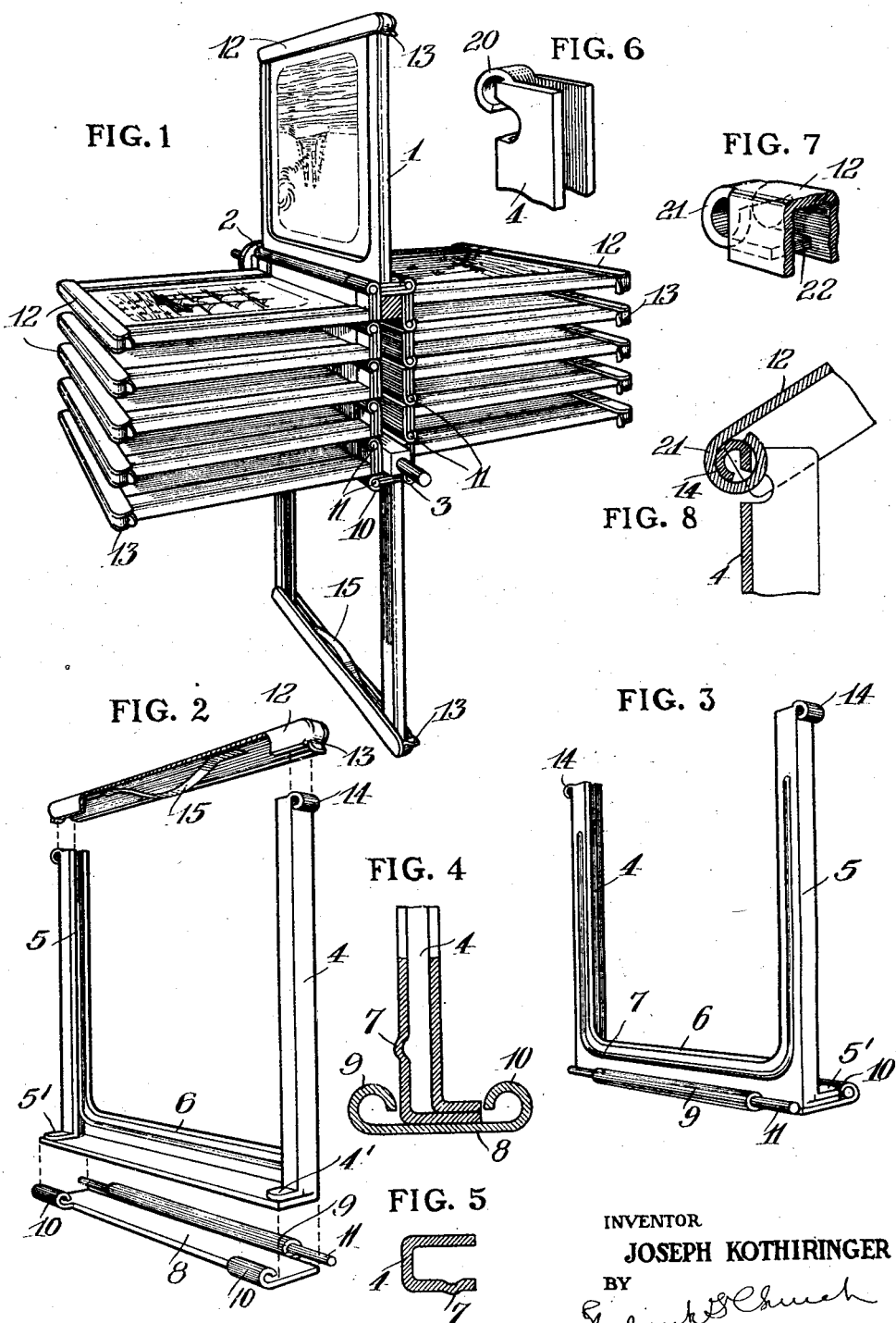

JOSEPH KOTHIRINGER, OF ROCHESTER, NEW YORK, ASSIGNOR TO BAUSCH & LOMB OPTICAL COMPANY, OF ROCHESTER, NEW YORK, A CORPORATION OF NEW YORK.

SLIDE CARRIER FOR PROJECTION APPARATUS.

1,409,186.   Specification of Letters Patent.   Patented Mar. 14, 1922.

Application filed July 17, 1919. Serial No. 311,402.

*To all whom it may concern:*

Be it known that I, JOSEPH KOTHIRINGER, a citizen of the United States, residing at Rochester, in the county of Monroe and State of New York, have invented certain new and useful Improvements in Slide Carriers for Projection Apparatus; and I do hereby declare the following to be a full, clear, and exact description of the same, reference being made to the accompanying drawings, forming a part of this specification, and to the reference numerals marked thereon.

My invention relates to slide carriers for projection apparatus and is especially designed for use with the apparatus disclosed in the application for patent for automatic projection apparatus of William L. Patterson, Ser. No. 156,553, filed March 22, 1917. The object of my invention is to provide a slide carrier of this kind which can be cheaply constructed from sheet metal and which can be easily assembled and disassembled for the purpose of increasing or decreasing the number of slide frames in the carrier. A further object of my invention is to provide a slide carrier constructed of a plurality of sheet metal frames hinged to each other along the edges of their bases and each adapted to contain a slide. A further object of my invention is to provide a slide frame for a slide carrier which is constructed of sheet metal channeled to provide grooves for retaining the slide and improved means for securing the slide in the frame.

Referring more particularly to the drawings:

Figure 1 is a perspective view of a slide carrier constructed according to my invention.

Figure 2 is a perspective view of a slide frame detached from the carrier, the hinge member and cap member being detached for clearness.

Figure 3 is a perspective view of the slide frame with the cap member detached.

Figure 4 is a sectional view through the base of the slide frame.

Figure 5 is a sectional view through the side of the slide frame.

Figures 6, 7 and 8 are detailed sectional views showing a modified construction for mounting the cap on the frame.

My improved slide carrier shown in Figure 1 comprises a plurality of slide frames 1 hinged together along the edges of their bases as at 2 and 3 to form an endless flexible carrier. The pintles of the hinges are readily removable for the purpose of detaching one or more of the frames from the carrier or adding more frames thereto. Each of the frames comprises a U shaped member having channeled end portions 4 and 5 and connected by an integral base member 6 which can be stamped from a single piece of sheet metal. For the purpose of stiffening and strengthing the frame a corrugation or rib 7 may be stamped on one side thereof as clearly shown in Figure 3. The side portions 4 and 5 are formed to provide channels open at the outer ends of said portions to provide slots for engaging the edges of a slide which is adapted to rest upon the base member of the frame. The base member is formed integral with the members 4 and 5 by bending over the member 6 against bent up portions 4' and 5' at the bases of the side portions 4 and 5. Secured to the bases 6 of each of the frames is a hinge member 8 having turned up portions 9 and 10 at its sides to provide hinge portions adapted to co-operate with pintles 11 by which adjacent frames are pivotally connected to each other. The member 8 may be welded electrically, soldered or otherwise secured to the frame member 6. For retaining the slide within the frame members 4 and 5 a cap member 12 is employed. The cap member shown in Figure 2 is channeled and stamped out of sheet metal and provided with leaf spring securing members 13 at its ends adapted to engage projections 14 on the side members 4 and 5. The projections 14 are formed integral with the portions 4 and 5 and stamped up from the same piece of sheet metal. It will be noted that by this construction the channeled cap members 12 can be readily removed or applied to the frame members and are held in position by the engagement of the members 13 with the members 14. In order to prevent rattling of the slide in the frame or movement of the slide relatively to the frame in which it is mounted a leaf spring 15 may be secured in the groove or channel of the cap member to resiliently engage the edge of the slide. Referring to the modification shown in Figures 6, 7 and 8 the upper end of one of the members 4 or 5 is provided with a hinge member 20 struck up from the material of the side member and one end of the cap member 12 is provided with a co-operating hinge member 21, the other end of the cap member 12 being formed with an engaging spring member 13 as shown in Figure 2. In assembling the form shown in Figures 6, 7 and 8 the hinge member on the cap is first bent over upon itself within the groove as shown at 22 in Figure 7. It is then placed over the hinge member 20 and bent to the position shown in Figure 8. In a modified form shown in Figures 6, 7 and 8, the cap member 12 is hinged or pivoted to the side member 4 and when in closed position engages the member 14 of the other side member. This form is in many respects to be preferred, since the cap member is permanently secured to the slide frame and is much simpler to manipulate than a cap member such as shown in Figure 2.

I claim as my invention:

1. A slide carrier for projection lanterns, comprising a plurality of frames each having channeled end members open at their outer ends and adapted to receive a lantern slide between them, a base member connecting said end members, means on the sides of said base member for hinging the frame between adjacent frames, and means for retaining a lantern slide in the frame.

2. A slide carrier for projection lanterns, comprising a plurality of frames each having channeled end members open at their outer ends and connected at their bases and adapted to receive a lantern slide between them, a base member connecting said end members, hinge portions permanently secured on opposite sides of said base member removably secured in said hinge portions pintles for hinging the frame to adjacent frames, and means for retaining a lantern slide in the frame.

3. A slide frame for projection apparatus comprising a part made of a single piece of sheet metal and having a pair of channeled end members open at their outer ends to receive a slide, a base member connecting said end members, a hinge member formed at the upper end of one of said end channel members and integral therewith, a sheet metal cap having a member co-operating with the hinge member on said channel member and adapted to engage the other channel member and close the upper ends of the channels, and resilient means for engagement with the slide when said cap is closed on the frame to prevent movement of the slide in the frame.

4. A slide carrier for projection apparatus comprising a plurality of sheet metal members each having hinge portions on opposite sides adapted to receive a pintle whereby they are detachably hinged together to form an endless carrier, a slide frame on each of said members comprising a single piece of sheet metal provided with a flange permanently secured to said member and having spaced channeled end members open at their outer ends to receive a slide, and a cap removably secured to the outer ends of said end members to hold the slide in the frame.

JOSEPH KOTHIRINGER.